United States Patent [19]
Sugiyama et al.

[11] Patent Number: 5,580,991
[45] Date of Patent: Dec. 3, 1996

[54] PROCESS FOR PREPARING BUTYROLACTONE AND METHOD FOR SEPARATING ORGANIC PHOSPHOROUS-RUTHENIUM COMPLEX AS CATALYST AND REUSING THE SAME

[75] Inventors: Hitoshi Sugiyama; Kazunari Takahashi, both of Kurashiki; Haruhiko Kusaka, Yokohama, all of Japan

[73] Assignee: Mitsubishi Chemical Corporation, Tokyo, Japan

[21] Appl. No.: 416,090

[22] Filed: Apr. 4, 1995

[30] Foreign Application Priority Data

Apr. 5, 1994 [JP] Japan .................................. 6-089226
Apr. 5, 1994 [JP] Japan .................................. 6-089227

[51] Int. Cl.$^6$ ............................ C07D 307/20; B01J 31/40
[52] U.S. Cl. ................. 549/325; 502/22; 502/24; 502/25; 502/166; 568/8; 568/17
[58] Field of Search .................. 549/325; 502/22, 502/24, 25; 568/8, 17

[56] References Cited

U.S. PATENT DOCUMENTS

| | | | |
|---|---|---|---|
| 3,547,964 | 12/1970 | Oliver | 260/429 |
| 4,021,463 | 5/1977 | Krummer et al. | 252/413 |
| 4,228,033 | 10/1980 | Yamauchi et al. | 502/24 |
| 4,329,521 | 5/1982 | Homeier | 568/909 |
| 4,605,541 | 8/1986 | Pugach | 502/24 |
| 4,892,955 | 1/1990 | Wada et al. | 549/325 |
| 4,931,573 | 6/1990 | Wada et al. | 549/325 |
| 4,935,550 | 6/1990 | Miller et al. | 502/24 |
| 5,021,589 | 6/1991 | Wada et al. | 549/325 |
| 5,047,561 | 9/1991 | Miyazawa et al. | 549/325 |

FOREIGN PATENT DOCUMENTS

| | | |
|---|---|---|
| 066436 | 12/1982 | European Pat. Off. . |
| 0256813 | 2/1988 | European Pat. Off. . |
| 0420062 | 4/1991 | European Pat. Off. . |
| 0475036 | 3/1992 | European Pat. Off. . |
| 0500150 | 8/1992 | European Pat. Off. . |

*Primary Examiner*—Bernard Dentz
*Attorney, Agent, or Firm*—Oblon, Spivak, McClelland, Maier & Neustadt, P.C.

[57] ABSTRACT

The disclosure describes a method for separating a ruthenium complex, which comprises removing an objective hydrogenation reaction product from a hydrogenation reaction solution of an organic carbonyl compound in the presence of a ruthenium complex having a tertiary organic phosphorus compound as ligand to obtain a catalyst solution, contacting said catalyst solution with a polar solvent, and carrying out a phase-separation into a liquid phase substantially composed of the polar solvent and an another liquid phase substantially containing the ruthenium complex.

45 Claims, 1 Drawing Sheet

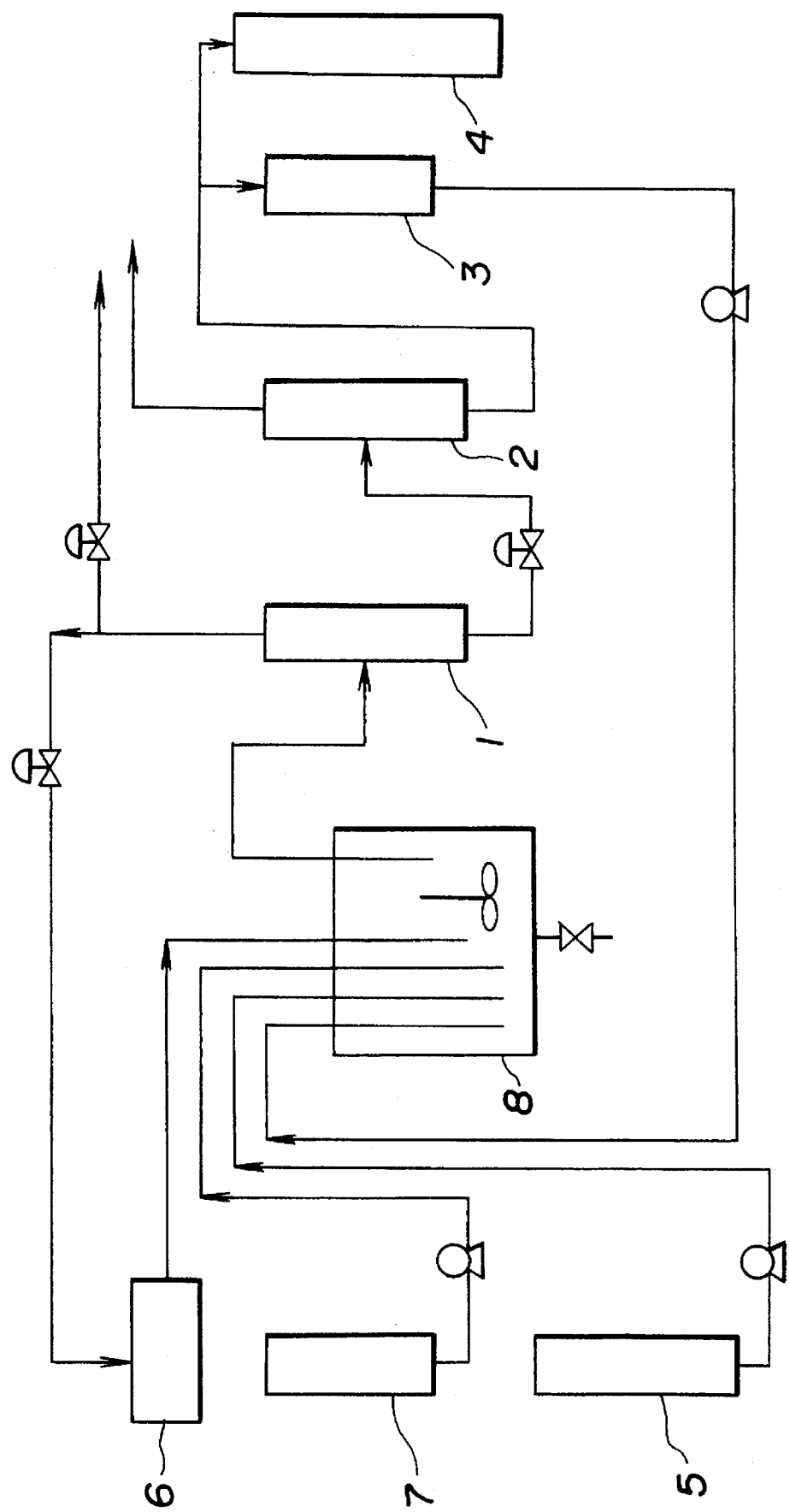

PROCESS FOR PREPARING BUTYROLACTONE AND METHOD FOR SEPARATING ORGANIC PHOSPHOROUS-RUTHENIUM COMPLEX AS CATALYST AND REUSING THE SAME

BACKGROUND OF THE INVENTION

The present invention relates to a method for separating organic phosphorus-ruthenium complex as a catalyst, a method for reusing the same, a process for preparing γ-butyrolactone, and a method for recovering an organic phosphorus compound as ligand. More particularly, the present invention relates to a method for separating a ruthenium complex and/or an organic phosphorous compound as a catalyst or a ligand thereof from products of hydrogenation reaction of a dicarboxylic acid or a derivative thereof using a ruthenium complex having a tertiary organic phosphorous compound as ligand, a method for reusing the separated ruthenium complex, etc., for the hydrogenation reaction, a process for preparing γ-butyrolactone (GBL) from the hydrogenation reaction of succinic anhydride by reusing the separated ruthenium complex, and a method for recovering a tertiary organic phosphorous compound as a catalyst ligand from the hydrogenation reaction product.

Organic phosphorus-ruthenium complex having a tertiary organic phosphorus compound as ligand is used as catalyst for the homogenous-system catalytic hydrogenation reaction of various kinds of carbonyl compounds. Since this ruthenium complex catalyst is relatively stable in chemical properties, in the hydrogenation reaction system using such catalyst, the reaction product and the catalyst solution can be separated by distillation and the separated catalyst solution can be recycled to the reaction vessel for reuse. Also, the reaction product can be effused out of the reaction vessel by gas stripping and the reaction can be carried out continuously with the catalyst solution remaining in the reaction vessel. However, in these reactions, there are inevitably formed various high-boiling by-products, and in case where the reaction is carried out continuously, since the high-boiling substances are accumulated in the catalyst solution, it is necessary to discharge a part of the catalyst solution from the reaction system continuously or intermittently.

Since ruthenium is contained in the discharged solution, a proper treatment is required in disposal thereof. However, as from the solution containing ruthenium, when burned, $RuO_4$ which is poisonous and has strong corrosiveness is produced, the burning treatment of the solution for its disposal is undesirable. Also, economical problem is involved in an industrial waste disposal of the solution containing ruthenium, since cost equivalent to the mass of the solution to be treated, is charged when the amount of the solution to be treated is large. Therefore, if ruthenium in the discharged solution can be concentrated, its economical effect will be very great. Further, if ruthenium complex can be recovered efficiently from the discharged solution and reused for the reaction, it will be possible not only to greatly reduce the expenses for disposal of the solution containing ruthenium but also to remarkably lessen the cost for catalyst. This is, also, favorable from the viewpoint of prevention of environmental pollution, since the absolute amount of ruthenium released into the atmosphere is reduced. For attaining this, however, it is necessary to separate and recover the complex catalyst retaining its active state from the reaction solution.

Hitherto, as methods for separating and recovering VIII Group metals such as rhodium, there have been known an extraction method using a strong acid (Japanese Patent Publication (KOKOKU) No. 46-43219) and a decomposition method using a peroxide (U.S. Pat. No. 3,547,964 and Japanese Patent Application Laid-Open (KOKAI) No. 51-63388). However, any of these methods involved the problem of corrosion of the apparatus, since an acid is used in these methods.

As a result of the present inventors' earnest studies for the economical and efficient recovery of a ruthenium complex having a tertiary organics phosphorus compound as ligand from a hydrogenation reaction solution of an organic carbonyl compound and for reuse of the recovered ruthenium complex for the hydrogenation reaction, it has been found that by separating an objective product and as occasion demands, a reaction solvent from the hydrogenation reaction solution, and contacting the resultantly obtained catalyst solution with a polar solvent, it is possible to recover an organic phase rich with ruthenium complex and/or organic phosphorus compound, and to reuse the recovered ruthenium complex as a catalyst component for the hydrogenation reaction. The present invention has been attained on the basis of this finding.

SUMMARY OF THE INVENTION

It is an object of the present invention to provide a method for efficiently and economically recovering ruthenium complex from the hydrogenation reaction solution of an organic carbonyl compound in the presence of as catalyst ruthenium complex having a tertiary organic phosphorus compound as ligand, and a method for reusing the recovered ruthenium complex as a catalyst component for the hydrogenation reaction.

To accomplish the aim, in a first aspect of the present invention, there is provided a method for separating a ruthenium complex, which comprises removing an objective hydrogenation reaction product from a hydrogenation reaction solution of an organic carbonyl compound in the presence of a ruthenium complex having a tertiary organic phosphorus compound as ligand, to obtain a catalyst solution, contacting said catalyst solution with a polar solvent, and carrying out a phase-separation into a liquid phase substantially composed of the polar solvent and an another liquid phase substantially containing the ruthenium complex.

In a second aspect of the present invention, there is provided a method for separating a ruthenium complex, which comprises removing an objective hydrogenation reaction product from a hydrogenation reaction solution of an organic carbonyl compound in the presence of a ruthenium complex having a tertiary organic phosphorus compound as ligand, to obtain a catalyst solution, contacting said catalyst solution with a polar solvent containing a basic substance, and carrying out a phase-separation into a liquid phase substantially composed of the polar solvent and an another liquid phase substantially containing the ruthenium complex.

In a third aspect of the present invention, there is provided a method for separating a ruthenium complex, which comprises removing an objective hydrogenation reaction product from a hydrogenation reaction solution of an organic carbonyl compound in the presence of a ruthenium complex having a tertiary organic phosphorus compound as ligand, to obtain a catalyst solution, contacting said catalyst solution with water and nonpolar organic solvent, separating a nonpolar organic solvent phase containing the ruthenium complex, and removing the nonpolar organic solvent from said nonpolar organic solvent phase by distillation.

In a fourth aspect of the present invention, there is provided a method for separating a ruthenium complex, which comprises hydrogenating succinic anhydride in a triglyme solvent in the presence of a ruthenium complex having trialkyl phosphine as ligand, removing γ-butyrolactone as products and water from the reaction solution by distillation to obtain a catalyst solution, contacting at least a part of the catalyst solution with an aqueous solution of a sodium hydroxide or potassium hydroxide, and separating the liquid phase rich with the ruthenium complex.

In a fifth aspect of the present invention, there is provided a method for separating a ruthenium complex, which comprises removing γ-butyrolactone and water from the reaction solution obtained by hydrogenating succinic anhydride in a triglyme solvent in the presence of a ruthenium complex having trialkyl phosphine as ligand, distilling away triglyme in a distillation tower while maintaining the bottom temperature at not more than 220° C. to obtain a catalyst solution, contacting at least a part of the catalyst solution with water and an aliphatic or aromatic hydrocarbon, and separating the an aliphatic or aromatic hydrocarbon phase rich with the ruthenium complex.

In a sixth aspect of the present invention, there is provided a method for separating a ruthenium complex, which comprises removing an objective hydrogenation reaction product from a hydrogenation reaction solution of an organic carbonyl compound in the presence of a ruthenium complex having a tertiary organic phosphorus compound as ligand, to obtain a catalyst solution, contacting said catalyst solution with a polar solvent and a nonpolar organic solvent successively or simultaneously, carrying out a Phase,separation into a phase substantially composed of the polar solvent and an organic solvent phase substantially containing the ruthenium complex, and removing the organic solvent from said organic solvent phase by distillation.

In a seventh aspect of the present invention, there is provided a method for reusing a ruthenium complex, which comprises removing an objective hydrogenation product from a hydrogenation reaction solution of an organic carbonyl compound in the presence of a ruthenium complex having a tertiary organic phosphorus compound as ligand, to obtain a catalyst solution, contacting said catalyst solution with a polar solvent, carrying out a phase-separation into a liquid phase substantially containing the polar solvent and an another liquid phase substantially containing the ruthenium complex, and supplying the separated liquid phase substantially containing the ruthenium complex to the hydrogenation reaction system.

In an eighth aspect of the present invention, there is provided a method for reusing a ruthenium complex, which comprises removing an objective hydrogenation reaction product from a hydrogenation reaction solution of an organic carbonyl compound in the presence of a ruthenium complex having a tertiary organic phosphorus compound as ligand, to obtain a catalyst solution, contacting said catalyst solution with a polar solvent and a nonpolar organic solvent successively or simultaneously, carrying out a phase-separation into a phase substantially composed of the polar solvent and an organic solvent phase substantially containing the ruthenium complex, removing the organic solvent from said organic solvent phase by distillation, and supplying the obtained ruthenium complex-containing residue to the hydrogenation reaction system.

In a ninth aspect of the present invention, there is provided a method for reusing a ruthenium complex, which comprises hydrogenating succinic anhydride in a reaction solvent in the presence of a ruthenium complex having trialkylphosphine as ligand, removing γ-butyrolactone and water from the reaction solution, distilling away the reaction solvent in a distillation tower while maintaining the bottom temperature at not more than 220° C. to obtain a catalyst solution, contacting at least a part of said catalyst solution with an aqueous solution of sodium hydroxide or potassium hydroxide and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing residue solution, treating the obtained solution with an acid, and supplying the thus treated solution to the hydrogenation reaction system.

In a tenth aspect of the present invention, there is provided a method for reusing a ruthenium complex, which comprises hydrogenating succinic anhydride in a reaction solvent in the presence of a ruthenium complex having trialkylphosphine as ligand, removing γ-butyrolactone and water from the reaction solution, distilling away the reaction solvent in a distillation tower while maintaining the bottom temperature at not more than 220° C. to obtain a catalyst solution, contacting at least a part of said catalyst solution with water and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing residue solution, treating the obtained solution with an acid, and supplying the thus treated solution to the hydrogenation reaction system.

In an eleventh aspect of the present invention, there is provided a process for preparing γ-butyrolactone, which comprises hydrogenating succinic anhydride in a reaction solvent in the presence of a ruthenium complex having trialkylphosphine as ligand, removing γ-butyrolactone and water from the reaction solution, distilling away the reaction solvent in a distillation tower while maintaining the bottom temperature at not more than 220° C. to obtain a catalyst solution, contacting at least a part of said catalyst solution with an aqueous solution of sodium hydroxide or potassium hydroxide and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing residue solution, treating the obtained solution with an acid, and supplying the thus treated solution to the hydrogenation reaction system.

In a twelfth aspect of the present invention, there is provided a process for preparing γ-butyrolactone, which comprises hydrogenating succinic anhydride in a reaction solvent in the presence of a ruthenium complex having trialkylphosphine as ligand, removing γ-butyrolactone and water from the reaction solution, distilling away the reaction solvent in a distillation tower while maintaining the bottom temperature at not more than 220° C. to obtain a catalyst solution, contacting at least a part of said catalyst solution with water and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing residue solution, treating the obtained solution with an acid, and supplying the thus treated solution to the hydrogenation reaction system.

In a thirteenth aspect of the present invention, there is provided a process for recovering an organic phosphorus compound, which comprises hydrogenating an organic carbonyl compound in the presence of a ruthenium complex having a tertiary organic phosphorus compound as ligand and an excess amount of a tertiary organic phosphorus compound, removing an objective hydrogenation reaction product of organic carbonyl compound from the hydrogenation reaction solution to obtain a catalyst solution, contacting the obtained catalyst solution with a polar solvent, and carrying out a phase-separation into a liquid phase substantially containing the polar solvent and an another liquid phase containing a tertiary organic phosphorus compound.

In a fourteenth aspect of the present invention, there is provided a process for recovering an organic phosphorus compound, which comprises hydrogenating an organic carbonyl compound in the presence of a ruthenium complex having a tertiary organic phosphorus compound as ligand and an excess amount of a tertiary organic phosphorus compound, removing an objective hydrogenation reaction product of organic carbonyl compound from the hydrogenation reaction solution to obtain a catalyst solution, contacting the catalyst solution with a polar solvent and a nonpolar organic solvent successively or simultaneously, carrying out a phase-separation into a phase substantially composed of the polar solvent and an organic solvent phase substantially containing the ruthenium complex, removing the organic solvent from said organic solvent phase by distillation.

BRIEF DESCRIPTION OF DRAWINGS

FIG. 1 is a block diagram of the recycle reaction system in which hydrogenation reaction of succinic anhydride described in Reference Example 1 was carried out.

DETAILED DESCRIPTION OF THE INVENTION

In accordance with the present invention, ruthenium complex is concentrated and separated from the hydrogenation reaction solution of an organic carbonyl compound containing ruthenium complex having at least one tertiary organic phosphorus compound as ligand, and the separated and recovered ruthenium complex is reused for the hydrogenation reaction as occasion demands. The hydrogenation reaction in the present invention include hydrogenation reaction of organic carbonyl compounds used as starting material, for example, hydrogenation reaction of aliphatic dicarboxylic acids, aliphatic dicarboxylic anhydrides, aliphatic dicarboxylic diesters and the like.

As the aliphatic dicarboxylic acids, saturated or unsaturated dicarboxylic acids such as maleic acid, succinic acid, fumaric acid, itaconic acid, citraconic acid, mesaconic acid, methylsuccinic acid, glutaric acid and the like may be exemplified. As the aliphatic dicarboxylic anhydrides, saturated or unsaturated dicarboxylic anhydrides such as maleic anhydride, itaconic anhydride, citraconic anhydride, methylsuccinic anhydride, glutaric anhydride and the like may be exemplified. As the aliphatic dicarboxylic diesters, dialkyl esters of the above-mentioned aliphatic dicarboxylic acids such as dimethyl maleate, diethyl fumarate, di-n-butyl succinate and the like may be exemplified. For producing γ-butyrolactone, maleic anhydride, succinic anhydride, maleic acid, succinic acid or fumaric acid may be preferably used.

The method of the present invention is especially useful for concentrating and separating ruthenium complex from the reaction solution produced by the hydrogenation reaction of succinic anhydride for producing γ-butyrolactone using as homogenous-system catalyst a ruthenium complex having a tertiary organic phosphorus compound as ligand, and for reusing the separated ruthenium complex for the hydrogenation reaction.

The ruthenium complex catalyst for the hydrogenation reaction used in the present invention is not specifically limited as far as ruthenium complex catalysts have at least one tertiary organic phosphorus compound as ligando Specifically, as the catalyst used for producing γ-butyrolactone by hydrogenation reaction of succinic anhydride, there can be used a catalyst containing (a) ruthenium, (b) tertiary organic phosphine and (c) a conjugated base of an acid having a pka value of less than 2, disclosed in U.S. Pat. No. 4,892,955 and U.S. Pat. No. 5,021,589. Ruthenium complexes containing neutral ligands may be used as the ruthenium complex catalysts. Compounds of the metals selected from Groups IVA, VA and IIIB of the Periodic Table may be jointly used with the above-mentioned ruthenium complex catalysts (U.S. Pat. No. 4,931,573). Examples of the respective catalyst components are listed below.

(a) Ruthenium

Both of metallic ruthenium and ruthenium compounds can be used. Ruthenium compounds include ruthenium oxides, ruthenium halides, ruthenium hydroxides, organic or inorganic acids salts of ruthenium, and complex compounds of ruthenium, such as ruthenium dioxide, ruthenium tetraoxide, ruthenium dihydroxide, ruthenium chloride, ruthenium bromide, ruthenium iodide, ruthenium nitrate, ruthenium acetate, tris(acetylacetone)ruthenium, sodium hexachlororuthenate, dipotassium tetracarbonylruthenate, pentacarbonylruthenium, cyclopentadienyldicarbonylruthenium, dibromotricarbonylruthenium, chlorotris(triphenylphosphine)hydridoruthenium, bis(tri-n-butylphosphine)tricarbonylruthenium, dodecacarbonyltriruthenium, tetrahydridodecacarbonyltetraruthenium, dicesium octadecacarbonylhyexaruthenate and tetraphenylphosphonium undecacarbonylhydridotriruthenate. The amount of such metallic ruthenium or ruthenium compound used as catalyst component is 0.0001 to 100 milimoles, preferably 0.001 to 10 milimoles (calculated as ruthenium in one liter of the hydrogenation reaction solution).

(b) Tertiary organic phosphines

It is considered that organic phosphine contributes to control of the electronic state of ruthenium or stabilization of the active state of ruthenium. Examples of the organic phosphines usable as catalyst component in the present invention include trialkylphosphines such as tri-n-octylphosphine, tri-n-butylphosphine and dimethyl-n-octylphosphine, tricycloalkylphosphines such as tricyclohexylphosphine, triarylphosphines such as triphenylphosphine, alkylarylphosphines such as dimethylphenylphosphine, and polyfunctional phosphines such as 1,2-bis(diphenylphosphino)ethane. Of these organic phosphines, trialkylphosphines, especially trioctylphosphine are preferred.

Organic phosphine is used in an amount of usually about 3 to 1,000 moles, preferably 5 to 100 moles based on one mole of ruthenium. That is, it is considered that usually coordination of 3 moles of organic phosphine based on one mole of ruthenium is appropriate, but for the preparation of the catalyst used in the present invention, it is preferable to use an organic phosphine in a more amount than the number of moles necessary for the coordination. The existence of this excess organic phosphine in the reaction system is to be accounted for, but it is supposed that it has some form of association with the substance existing in the system. It is considered that organic phosphine plays an important role for the activation of catalyst, but the presence of a large excess amount of organic phosphine in the reaction system is undesirable as it is reacted with succinic anhydride to impede the hydrogenation reaction. It is, therefore, recommended to adjust the amount of organic phosphine in the above-defined range. Also, organic phosphine can be supplied to the hydrogenation reaction system in the single form or in the form of a complex with ruthenium.

(c) Conjugated bases of acids with a pka value of less than 2

Conjugated base of acid with a pka value of less than 2 functions as an additive accelerator of ruthenium catalyst. It is possible to use any source capable of producing a conjugated base of an acid with a pka value of less than 2 in the preparation of catalyst or in the reaction system. For example, there can be used Brønsted acids with a pka value of less than 2 and various kinds of salts thereof, which include inorganic acids such as sulfuric acid, sulfurous acid, nitric acid, nitrous acid, perchloric acid, phosphoric acid, borofluoric acid, hexafluorophosphoric acid, tungstic acid, phosphomolybdic acid, phosphotungstic acid, silicontungstic acid, polysilicic acid and fluorosulfonic acid, organic acids such as trichloroacetic acid, dichloroacetic acid, trifluoroacetic acid, methanesulfonic acid, trifluoromethanesulfonic acid, laurylsulfonic acid, benzenesulfonic acid and p-toluenesulfonic acid, ammonium salts of these acids, and phosphonium salts of these acids. The same effect can be obtained by adding an acid derivatives such as acid halides, acid anhydrides, esters, acid amides, etc., which is considered capable to produce a conjugated salt of the above-mentioned acids in the reaction system.

The amount of the above-mentioned acids or salts thereof used as catalyst component in the present invention is in the range of 0.01 to 1,000 moles, preferably 0.1 to 100 moles, more preferably 0.5 to 20 moles based on one mole of ruthenium.

Besides the above-mentioned components (a), (b) and (c), the following substances may further be contained as neutral ligands: hydrogen; olefins such as ethylene, propylene, butene, cyclopentene, cyclohexene, butadiene, cyclopentadiene, cyclooctadiene and norbonadiene; oxygen-containing compounds such as carbon monoxide, diethyl ether, anisole, dioxane, tetrahydrofuran, acetone, acetophenone, benzophenone, cyclohexanone, propionic acid, capronic acid, butyric acid, benzoic acid, ethyl acetate, allyl acetate, benzyl benzoate and benzyl stearate; nitrogen-containing compounds such as nitrogen oxide, acetonitrile, propionitrile, benzonitrile, cyclohexylisonitrile, butylamine, aniline, toluidine, triethylamine, pyrrole, pyridine, N-methylformamide, acetamide, 1,1,3,3-tetramethylurea, N-methylpyrrolidone, caprolactum and nitromethane; sulfur-containing compounds such as carbon disulfide, n-butylmercaptan, thiophenol, dimethyl sulfide, dimethyl disulfide, thiophene, dimethyl sulfoxide and diphenyl sulfoxide; and phosphor-containing compounds other than organic phosphines such as tributylphosphine oxide, ethyldiphenylphosphine oxide, triphenylphosphine oxide, diethylphenyl phosphinate, diphenylmethyl phosphinate, diphenylethyl phosphinate, o,o-dimethylmethyl phosphonothioate, triethyl phosphite, triphenyl phosphate, triethyl phosphate, triphenyl phosphate and hexamethylphosphoric triamide.

Ruthenium complex catalyst having a tertiary organic phosphorus compound as ligand used in the present invention may be previously synthesized and isolated for use (J. Organometal. Chem. 77 C-31('74)), or its precursor may be added singly to the reaction system to prepare ruthenium complex catalyst in the reaction system.

Ruthenium complex Catalyst having a tertiary organic phosphorus compound as ligand may also be synthesized, for instance, by treating a halogen-containing ruthenium compound such as cyclooctadienedichlororuthenium or dichlorotristriphenylphosphineruthenium with a salt such as $M^+Y^-$ (wherein M represents an alkaline metal, an alkaline earth metal, an IB group metal or an onium cation, and Y represents a conjugated base of an acid with a pKa value of less than 2) (see, for instance, Inorg. Chem. 17, 1965 ('78), Formula (1)):

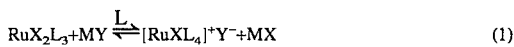

(wherein X represents a halogen atom such as chlorine atom or bromine atom; L represents an organic phosphine or a neutral ligand; and M and Y are as defined above).

It is also possible to prepare the said catalyst by a method in which a Brønsted acid with a pKa value of less than 2 or a salt thereof (an onium salt such as an ammonium salt, a phosphonium salt, a sulfonium salt or an oxonium salt) is added to a ruthenium compound such as dihydridotetrakis(triphenylphosphine)ruthenium or hydridochlorotris(triphenylphosphine)ruthenium, or a ruthenium which produces a ruthenium hydride compound under the hydrogenation reaction conditions (see, for instance, J. Chem. Soc. Dalton Trans. 370 ('75), Formula 2):

(wherein L and Y are as defined above; and M' represents an onium cation such as a proton, an ammonium ion, a phosphonium ion, a sulfonium ion or an oxonium ion).

It is further possible to prepare the said catalyst by a method in which the above-mentioned ruthenium compound is treated with a salt of a stable carbonium ion such as triphenylcarbonium ion or tropylium ion (counter ion is a conjugated salt of an acid with a pKa value of less than 2) (see, for instance, Inorg. Chem. 17, 1965 ('75), Formula (3)):

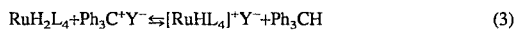

(wherein Y is as defined above).

The hydrogenation reaction using a ruthenium complex catalyst can be carried out by using the reactant organic carbonyl compound itself as solvent, but in consideration of the progress of the reaction and treatments of the reaction product, it is advantageous to use a solvent other than the reactant.

The solvents usable for the reaction in the present invention include ethers such as diethyl ether, anisole, tetrahydrofuran, ethylene glycol diethyl ether, triethylene glycol dimethyl ether and dioxane; ketones such as acetone, methyl ethyl ketone and acetophenone; alcohols such as methanol, ethanol, n-butanol, benzyl alcohol, ethylene glycol and diethylene glycol; phenols; carboxylic acids such as formic acid, acetic acid, propionic acid and toluic acid; esters such as methyl acetate, n-butyl acetate and benzyl benzoate;

aromatic hydrocarbons such as benzene, toluene, ethylbenzene and tetralin; aliphatic hydrocarbons such as n-hexane, n-octane and cyclohexane; halogenated hydrocarbons such as dichloromethane, trichloroethane and chlorobenzene; nitrated hydrocarbons such as nitromethane and nitrobenzene; carboxylic acid amides such as N,N-dimethylformamide, N,N-dimethylacetamide and N-methylpyrrolidone; other amides such as hexamethylphosphoric acid triamide and N,N,N',N'-tetraethylsulfamide; ureas such as N,N'-dimethylimidazolidone and N,N,N,N-tetramethylurea; sulfones such as dimethylsulfone and tetramethylenesulfone; sulfoxides such as dimethyl sulfoxide and diphenyl sulfoxide; lactones such as γ-butyrolactone and ε-caprolactone; polyethers such as triglyme(triethylene glycol dimethyl ether), tetraglyme(tetraethylene glycol dimethyl ether) and 18-crown-6; nitriles such as acetonitrile and benzonitrile; carbonic acid esters such as dimethyl carbonate and ethylene carbonate.

For carrying out the above hydrogenation reaction, the reactant organic carbonyl compound, the above-mentioned catalyst components with a pre-adjusted organic phosphine concentration and if necessary, a solvent are introduced into a reaction vessel, followed by passing of hydrogen gas through the reaction mixture. As the hydrogen gas used here, one which has been diluted with a gas inert to the reaction, such as nitrogen or carbon dioxide may be used. Reaction temperature is usually 50° to 250° C., preferably 100° to 250° C., more preferably 150° to 220° C. The partial pressure of hydrogen in the reaction system is not specifically defined, but in the industrial practice of the reaction, it is usually 0.1 to 100 kg/cm$^2$, preferably 1 to 50 kg/cm$^2$. The objective product is separated from the reaction solution by the ordinary means such as distillation or extraction.

The residue after separation is constantly checked for the concentration of the catalyst composition contained therein and recycled to the reactor (reaction vessel) by properly supplying organic phosphine in the course of circulation to maintain the organic phosphine concentration in the reaction solution at the prescribed level mentioned above.

In the process of the present invention, a ruthenium complex is concentrated and separated from the hydrogenation reaction solution such as described above. The objective product is first separated from the reaction solution and further the solvent used for the reaction is removed by distillation as occasion demands, to obtain a concentrated catalyst solution. In the hydrogenation reaction of succinic anhydride, water produced along with the objective product γ-butyrolactone is also separated from the reaction solution and then the reaction solvent is removed from the resultant reaction solution by distillation.

Removal of the solvent from the reaction solution facilitates liquid separation in the ensuing extraction treatment. Especially, in case an oil- and water-compatible solvent is used in the hydrogenation reaction, liquid separation may fail to take place in a desired way unless the extraction treatment is conducted after removing the solvent. It is, therefore, recommended to carry out the extraction treatment after removing the reaction solvent to such an extent that the remaining organic solvent will become 0 to 20% by weight, preferably 0 to 10% by weight, more preferably 0 to 5% by weight.

Removal of the solvent from the reaction solution can be performed by ordinary distillation. Vacuum distillation may be employed depending on the kind of the solvent involved. In any case, it is preferable to conduct distillation while maintaining the tower bottom temperature not more than 220° C. to prevent denaturing of the ruthenium complex existing in the solution.

The thus obtained catalyst solution is then treated according to either of the following methods to accomplish the object of the present invention.

(1) The catalyst solution is treated with a polar solvent, preferably a polar solvent containing a basic substance (basic substance-containing polar solvent), especially with water, more preferably an aqueous solution of a basic substance. By the treatment with the basic substance-containing solvent, a part of the organic compounds contained in the reaction solution is converted into a substance soluble in the polar solvent, for example, a water-soluble substance, and the organic compounds is distributed in (pass into) the polar solvent phase and are separated from the oil phase (reaction solution phase) containing ruthenium complex as main constituent. For example, the organic acids such as carboxylic acid in the reaction solution are reacted with the basic substance to form a salt which is soluble in the polar solvent, while the high-boiling point substances such as polyester are solvolyzed with basic substance to form a substance having a higher polarity, which is soluble in the polar solvent. In this way, the said organic compounds pass into the polar solvent phase containing a basic substance and can be separated from the ruthenium complex-containing phase.

The basic substances usable in the present invention include hydroxides of alkali metals or alkaline earth metals such as sodium hydroxide, potassium hydroxide and calcium hydroxide, organic amines such as triethylamine and n-propylamine, and ammonia. For industrial use, alkali metal hydroxides such as sodium hydroxide and potassium hydroxide are recommendable for easy availability.

The amount of the basic substance to be added depends on the properties of the hydrogenation reaction product, but it should be an amount sufficient to neutralize the acidic substances contained in the reaction solution after separation of the objective product and to partially or perfectly solvolyze the high-boiling substances such as polyester. Solvolysis of only a part of high-boiling substances can make the solvolyzate soluble in water and contributes to easy separation of the ruthenium complex. The amount of the basic substance used, especially its upper limit, is not restricted, but in view of economy and other factors such as discharge problem, it suffices to exist an amount necessary for the reaction in which the basic substance is consumed in neutralization and solvolysis. That is, the amount of the basic substance is usually 0.001 to 10 times, preferably 0.01 to 1.0 times the molar number of the functional groups reactable with the basic substance in the solute contained in the reaction solution. The molar number of the functional groups reactable with the basic substance can be determined by neutralization titration of the reaction solution or other means.

The polar solvent which may dissolve the basic substance in the present invention is one whose dielectric constant ($\epsilon$) at 20° C. is not less than 15, preferably not less than 20, and whose boiling point is preferably 50° to 150° C., for example, water, a lower alcohol having 1 to 8 carbon atoms such as methanol, ethanol, propanol or butanol, or a ketone such as acetone or methyl ethyl ketone. Among them, water or a lower alcohol is preferably used for the reason of economy and safety.

The temperature used for the treatment of the catalyst solution with the polar solvent which may contain the basic substance is usually selected from the range of 0° to 150° C., preferably 20° to 100° C.

For the treatment of the catalyst solution with polar solvent which may contain the basic substance, it suffices to contact both of the said solution and solvent sufficiently, such contact being usually made by stirring. Stirring is preferably conducted upon completion of the reaction with the basic substance and continued till the passing-into equilibrium is reached. It may be finished before the passing-into equilibrium is reached. Usually stirring time is properly selected from the range of 10 minutes to 5 hours.

In case the basic substance is used in the form of an aqueous solution, a solvent with a relatively low polarity which can be separated from water, that is, a nonpolar organic solvent may be used for facilitating separation from the ruthenium complex. The nonpolar organic solvent used here is one whose dielectric constant ($\epsilon$) at 20° C. is not more than 6, preferably not more than 4, and whose boiling point is 50° to 200° C., preferably 50° to 150° C. Specifically, nonpolar organic solvent includes aliphatic hydrocarbons such as hexane, heptane, octane and decane; aromatic hydrocarbons such as benzene, toluene, xylene, diethylbenzene and isopropylbenzene (cumene); ethers such as diethyl ether, propyl ether, butyl ether, ethylphenyl ether and methylphenyl ether (anisole); oxanes such as 1,4-dioxane and 1,3,5-trioxane; alicyclic hydrocarbons such as cyclohexane and methylcyclohexane; and halogenated hydrocarbons such as dichloromethane, trichloroethane and chlorobenzene. Of these solvents, toluene, xylene, heptane and decane are preferred.

In the treatment of the catalyst solution with an aqueous basic substance solution and a nonpolar organic solvent, the order of treatment is not specified; (i) the catalyst solution may be first treated with the aqueous basic substance solution, and after removing the aqueous phase, the residue may be treated with the nonpolar organic solvent, or (ii) the aqueous basic substance solution and nonpolar organic solvent may be added simultaneously to the catalyst solution, followed by extraction of the mixed solution.

In case the catalyst solution is treated with the polar solvent which may contain a basic substance, the mixed solution which has been an emulsion after stirring, is separated into two phases: a polar solvent phase or a basic substance-containing polar solvent phase and an oil phase insoluble therein. The ruthenium complex is mainly distributed to the oil phase, and only a slight portion of ruthenium complex pass into the polar solvent phase or the basic substance-containing polar solvent phase. Typically, not less than 90% of ruthenium complex is distributed in the oil phase. Also, most of the free organic phosphorus compound liberated by the said treatment is distributed in the oil phase.

In case where the catalyst solution is treated with the basic substance-containing polar solvent and a nonpolar organic solvent simultaneously, the mixed solution which has been an emulsion after stirring is separated into three phases, biz. a nonpolar organic solvent phase, a polar solvent phase and an oil phase insoluble in the said phases, or into two phases, biz. a nonpolar organic solvent phase and a polar solvent phase. Ruthenium complex pass mostly into the nonpolar organic solvent phase, while only a slight portion of ruthenium complex pass into the polar solvent phase and oil phase. Typically, not less than 90% of ruthenium complex is distributed in the nonpolar organic solvent phase.

The organic phosphorus-compound liberated by the above treatment is distributed in the nonpolar organic solvent phase or in both of the nonpolar organic solvent phase and the oil phase almost equally.

When the nonpolar organic solvent is distilled away from the nonpolar organic solvent phase, there is obtained a ruthenium complex or an organic phosphorus compound as a highly concentrated oily residue.

(2) Water and a nonpolar organic solvent are added to the concentrated reaction solution and the resultant mixture is extracted. By this treatment, the water-soluble organic compounds pass into the aqueous phase while the ruthenium complex is extracted in the organic solvent phase and the obtained nonpolar organic solvent phase is separated out.

In the aqueous phase are extracted the water-soluble high-boiling substances in the organic compounds contained in the reaction solution, for example, the carboxylic acids as the substrate, or water-soluble esters, and further their polymers such as water-soluble polyesters.

The organic solvent used with water is a solvent with a relatively low polarity, that is, a nonpolar solvent, which can be separated from water. The nonpolar solvent used in the present invention is one whose dielectric constant ($\epsilon$) at 20° C. is not more than 6, preferably not more than 4, and whose boiling point is from 50° to 200° C., preferably from 50° to 150° C. Examples of the organic solvents usable in the present invention include aliphatic hydrocarbons such as hexane, heptane, octane and decane; aromatic hydrocarbons such as benzene, toluene, xylene, diethylbenzene and isopropylbenzene (cumene); ethers such as diethyl ether, propyl ether, butyl ether, ethylphenyl ether and methylphenyl ether (anisole); oxanes such as 1,4-dioxane and 1,3,5-trioxane; alicyclic hydrocarbons such as cyclohexane and methylcyclohexane; and halogenated hydrocarbons such as dichloromethane, trichloroethane and chlorobenzene.

In the treatment of the concentrated reaction solution (catalyst solution) with water and a nonpolar organic solvent, the order of treatment is not specified; (i) the concentrated reaction solution (catalyst solution) may be first treated with water and, after removing the aqueous phase, the residue may be extracted with a nonpolar organic solvent, or (ii) water and a nonpolar organic solvent may be added simultaneously to the concentrated reaction solution (catalyst solution), followed by extraction of the mixed solution.

The temperature used for the treatment of the concentrated reaction solution (catalyst solution) with water and an organic solvent is usually selected from the range of 0° to 150° C. preferably 20° to 100° C.

Stirring for the treatment of the concentrated reaction solution (catalyst solution) with water and the nonpolar organic solvent is preferably continued until the passing-into is completed. It may be finished before the passing-into equilibrium is reached. Specifically, the stirring time is in the range from 10 minutes to 10 days.

In case the concentrated reaction solution (catalyst solution) is treated with water and the nonpolar organic solvent simultaneously, the mixed solution which has been an emulsion after stirring, is separated into three phases, biz. a nonpolar organic solvent phase, an aqueous phase and an oil phase insoluble in the said phases, or into two phases, biz. a nonpolar organic solvent phase and an aqueous phase. The ruthenium complex is mainly distributed in the nonpolar organic solvent phase while only a slight portion of ruthenium complex is distributed in the aqueous and oil phases. In typical cases, not less than 80% of ruthenium complex pass into the nonpolar organic solvent phase.

When the nonpolar organic solvent is distilled away from the nonpolar organic solvent phase, ruthenium complex can be obtained as a highly concentrated oily residue.

Ruthenium complex is contained in a high concentration in the obtained oily residue of the said nonpolar organic solvent phase in the above mentioned treatments (1) and (2), so that if this ruthenium complex can be recycled to be used for the hydrogenation reaction, it will be of great industrial significance. Incidentally, in the thus obtained oily substance with highly concentrated ruthenium complex, there may be contained a substance which liberates an organic phosphorus compound as ligand (for example, organic phosphine) when placed under the high-temperature hydrogenation conditions. This substance is absent in the hydrogenation reaction solution. It is considered that such substance has been produced as a result of denaturation from an organic phosphine derivative in the course of treatment of the ruthenium complex with a basic substance for concentration and separation. Therefore, when this recovered ruthenium complex is used as principal catalyst in the batchwise reaction, a large amount of organic phosphine exists in the reaction system to give an undesirable effect on the hydrogenation reaction. That is, if both of organic phosphine and succinic anhydride exist in a high concentration, they are easily reacted with each other to impede the hydrogenation reaction.

In such a case, it is preferable to treat the recovered ruthenium complex-containing residue (oily substance) with an acid before reusing it for the hydrogenation reaction. By this acid treatment, the organic phosphine is converted into the reaction product with the acid and gives no adverse effect when used for the hydrogenation reaction. As the acid for the above treatment, there can be used any of the acids having a pka value of less than 2 used in the preparation of the catalyst described above. Of these acids, alkylsulfonic acids such as methanesulfonic acid, trifluoromethanesulfonic acid and laurylsulfonic acid, and arylsulfonic acids such as benzenesulfonic acid and p-toluenesulfonic acid are preferred. P-toluenesulfonic acid is especially preferred.

The amount of the acid used depends on the kind of the acid used, but usually it is at least equivalent(as free acid) to the organic phosphine contained in the oily substance and liberated under the reaction conditions. In treating the oily substance with an acid, it is effective to treat the oily substance after dissolving it in the reaction solvent used for the hydrogenation reaction. The amount of the reaction solvent to be used is not restricted, but preferably it is substantially equalized with the solvent concentration under the hydrogenation reaction conditions.

The acid treatment is usually carried out at a temperature within the range of 20° to 300° C., preferably 100° to 250° C. in an atmosphere of an inert gas such as nitrogen gas or argon gas.

The solution containing the recovered and acid-treated ruthenium complex can be subjected to the hydrogenation reaction by adding an organic carbonyl compound such as succinic anhydride. The reaction activity of this ruthenium complex is equal to that of a freshly prepared catalyst, and the used ruthenium complex can be effectively recovered as catalyst.

In the case of a typical continuous reaction, since an organic carbonyl compound and the recovered ruthenium complex catalyst are introduced into the mixture of the massive circulation solution and the reaction solution, the concentrations of the substrate and organic phosphine in the reaction system lower, and hence there are induced no reaction impediments such as observed in the batchwise reaction.

As for the conditions for the hydrogenation reaction using the said recovered ruthenium complex catalyst, it is possible to employ the above-mentioned reaction conditions, but it is industrially advantageous to carry out the hydrogenation reaction under the conditions of an elevated catalyst concentration and a reduced pressure which allow efficient recovery of the catalyst, specifically under the conditions of ruthenium concentration of 100 to 500 ppm, reaction pressure (partial pressure of hydrogen) of 1 to 50 $kg/cm^2$ and reaction temperature of 150° to 220° C.

According to the process of the present invention, as described above, it is possible to economically and efficiently separate ruthenium complex having a tertiary organic phosphorus compound as ligand from the hydrogenation reaction solution of an organic carbonyl compound, and the separated solution is concentrated and reused for the hydrogenation reaction.

EXAMPLES

The present invention is hereinafter described in further detail with reference to the examples and Reference examples, but it should be understood that these examples are merely intended to be illustrative and not to be construed as limiting the scope of the invention.

Reference Example 1

Hydrogenation reaction of succinic anhydride was carried out using a ruthenium-trioctylphosphineparatoluenesulfonic acid-based complex catalyst in the manner described below.

The reaction was conducted in a circulation system having a gas-liquid separator 1 and a distillation tower 2 as shown in FIG. 1. In a catalyst container 3, 0.056% by weight of tris(acetylacetone)ruthenium, 0.51% by weight of trioctylphosphine and 0.22% by weight of paratoluenesulfonic acid were dissolved in triglyme(triethylene glycol dimethyl ether), and heated at 200° C. for 2 hours in a nitrogen atmosphere, and the obtained mixture was led into a fresh catalyst container 5 to prepare a fresh feedstock catalyst solution. This catalyst solution was supplied into an autoclave (reaction vessel) 8 at a flow rate of 3,500 ml/h from the fresh catalyst container 5, subjected to gas-liquid separation in the gas-liquid separator 1 and recovered as bottom liquid of the distillation tower 2 for recycling.

Meanwhile, hydrogen gas was supplied into the reaction vessel 8 from a hydrogen compressor 6 at a rate of 7.9 $Nm^3/h$ and adjusted to 40 atm. The reaction vessel 8 was heated to 205° C. and a feedstock solution composed of 80% by weight of succinic anhydride which is an organic carbonyl compound, and 20% by weight of γ-butyrolactone was continuously supplied to the reaction vessel 8 at a rate of 375 g/h from a feedstock container 7.

The reaction solution was cooled to 60° C. and subjected to gas-liquid separation under normal pressure in the gas-liquid separator 1, a part of the separated gas was discharged outside of the reaction system and the residue was recycled into the hydrogen compressor 6. The separated liquid products, i.e. water, γ-butyrolactone and catalyst solution were supplied into the distillation tower 2 and were subjected to distilling separation in the distillation tower 2. Butyrolactone and water distilled out from the top of the distillation tower 2, and the catalyst solution was withdrawn and supplied into the catalyst container 3. The catalyst solution in the catalysts container 3 was recycled to the reaction vessel 8. After passage of 7 days from the start of the reaction, a part of the catalyst solution was extracted at a flow rate of 29 g/h and stored in an extracted catalyst container 4.

The fresh feedstock catalyst solution was supplied into the reaction vessel from the fresh catalyst container 5 at a flow rate of 29 g/h corresponding to the extracted portion of the catalyst solution. The reaction was carried out continuously for a period of 30 days. A stable result was obtained from the 7th day after start of the reaction. Determinations of the reaction solution, starting materials in the product solution, products and high-boiling substances were made by gas chromatography and GPC. The results after 7th day from start of the reaction were as shown below on the average:

| Succinic anhydride conversion | 99.5% by weight |
| --- | --- |
| γ-butyrolactone yield | 97.5% by weight |
| High boiling substance yield | 2.5% by weight |

The composition of the extracted catalyst solution in the extracted catalyst container 4 was as follows on the average:

| Succinic anhydride + succinic acid | 4% by weight |
| --- | --- |
| γ-butyrolactone | 4% by weight |
| Triglyme | 65% by weight |
| High-boiling substance | 26% by weight |
| Ru concentration | 92 ppm |

Reference Example 2

The catalyst solution obtained in above Reference Example 1 was concentrated in the manner described below.

878.1 g of extracted catalyst solution was put into a jacket-type reactor provided with a vacuum distillation and the solvent triglyme was removed by vacuum distillation. The degree of vacuum was controlled to stay within the range of 70 to 5 mmHg to keep the solution temperature of not more than 160° C. 295.75 g of concentrated catalyst solution was obtained. The mass concentration percentage was 33.68%.

Furthermore, the concentrated catalyst solution obtained was diluted with triglyme and analyzed by gas chromatography under the conditions described later. No peak of trioctylphosphine was observed. This indicates that no trioctylphosphine was present in the concentrated solution before the extraction treatment.

Example 1

94.9 g of extracted catalyst solution [composition: 65% triglyme, 4% γ-butyrolactone, 4% succinic anhydride and succinic acid, and 26% high-boiling substances; Ru content: 92 ppm (calculated as Ru)] from the hydrogenation reaction of succinic anhydride obtained in Reference Example 1 and 113.1 g of 0.1N-NaOH solution were supplied into a separatory funnel and mixed by shaking at room temperature for about 5 minutes. The mixed solution was left stationary for about 15 minutes and separated into two phases. The mass of the upper aqueous phase was 197.4 g and the mass of the lower oil phase was 10.6 g. This means that the mass of the oil phase was concentrated to 11.1% based on the charged reaction solution. The ruthenium concentration was 0.45 ppm in the aqueous phase and 758 ppm in the oil phase. The oil phase/aqueous phase ruthenium distribution ratio was 99.0/1.0.

Example 2

The same procedure as in Example 1 was carried out except that desalted water was used in place of 0.1N NaOH solution. The obtained solution, when left stationary after mixing by shaking, was merely clouded and failed to separate into different phases after about 15 minutes, but after left stationary for 7 days, such mixed solution was separated into two phases.

Example 3

511.41 g of extracted catalyst solution from the hydrogenation reaction of succinic anhydride obtained in Reference Example 1 and 504.90 g of 0.1N-NaOH solution were supplied into a 1-liter sealable container and mixed by shaking for about 5 minutes. The solution was left stationary to allow it to separate into two phases and then decanted. The aqueous phase was 983.49 g and its ruthenium content as determined by ICP analysis was 0.38 ppm.

The lower oil phase was 32.85 g. 200 ml of toluene was added to this oil phase, mixed by shaking for about 5 minutes and then left stationary. The solution was seen separating into an upper toluene phase and a lower toluene-insoluble oil phase. These two phases were separated by decantation. The lower oil phase was 25.43 g and its ruthenium content as determined by ICP was 11.8 ppm.

The toluene phase was washed 5 times with 100 g of desalted water and concentrated by evaporation to obtain a brown oily concentrate. The mass of this product was 9.97 g and its ruthenium content as determined by ICP was 4,320 ppm. This means that the mass of this concentrate was concentrated to 1.9% based on the charged catalyst solution. The toluene phase/oil phase/aqueous phase ruthenium distribution ratio was 98.5/0.7/0.8.

Example 4

114.02 g of concentrated catalyst solution obtained in Reference Example 2, 331.72 g of 0.1N-NaOH solution and 132.67 g of toluene were supplied into an extractor provided with a stirrer and stirred at an internal temperature of 40° C. for one hour. When left stationary, the solution separated into a toluene phase, an aqueous phase and an oil phase insoluble in both toluene and alkali solution in that order downwardly in about 5 minutes. These three phases were separated and their mass and ruthenium concentration were determined by ICP analysis to obtain the following results:

|  | Mass | Ru concentration |
| --- | --- | --- |
| Toluene phase | 128.79 g | 252 ppm |
| Aqueous phase | 386.12 g | 0 ppm |
| Oil phase | 57.05 g | 7 ppm |

The toluene phase/aqueous phase/oil phase ruthenium distribution ratio was 98.8/0/1.2.

Toluene in the toluene phase was evaporated away to give 10.59 g of residue. This means that this toluene phase was concentrated to 9.3% based on the charged concentrated catalyst solution.

Example 5

108.39 g of concentrated catalyst solution obtained in Reference Example 2, 315.32 g of 0.5N-NaOH solution and 126.1 g of toluene were supplied into an extractor provided with a stirrer and stirred at an internal temperature of 40° C. for one hour. When left stationary, the solution separated into a toluene phase, an aqueous phase and an oil phase insoluble in toluene and alkali solution in that order downwardly in about 5 minutes. These three phases were separated and their mass and ruthenium concentration were determined by ICP to obtain the following results:

|  | Mass | Ru concentration |
| --- | --- | --- |
| Toluene phase | 122.0 g | 260 ppm |
| Aqueous phase | 369.0 g | 0 ppm |
| Oil phase | 50.3 g | 14 ppm |

The toluene phase/aqueous phase/oil phase ruthenium distribution ratio was 97.8/0/2.2.

Toluene in the toluene phase was evaporated away to give 10.80 g of residue. This means that the toluene phase was concentrated to 10.0% based on the charged concentrated catalyst solution.

Example 6

122.43 g of concentrated catalyst solution obtained in Reference Example 2, 356.19 g of 3.0N-NaOH solution and 122.43 g of toluene were supplied into an extractor provided with a stirrer and stirred at an internal temperature of 40° C. for about 5 minutes. When left stationary, the solution separated into a toluene phase and an aqueous phase in about 5 minutes. These two phases were separated and their mass and ruthenium concentration were determined by ICP analysis to obtain the following results:

|  | Mass | Ru concentration |
| --- | --- | --- |
| Toluene phase | 170.66 g | 211 ppm |
| Aqueous phase | 443.24 g | 0 ppm |

The toluene phase/aqueous phase ruthenium distribution ratio was 97.8/0. Toluene in the toluene phase was evaporated away to give 28.22 g of residue. This means that the toluene phase was concentrated to 23.0% based on the charged concentrated catalyst solution.

Example 7

114.02 g of concentrated catalyst solution (whole amount of phosphorus determined by ICP: 4,000 ppm) obtained in Reference Example 2, 331.72 g of 0.1N-NaOH solution and 132.67 g of toluene were supplied into an extractor provided with a stirrer and stirred at an internal temperature of 40° C. for one hour. When left stationary, the solution separated into a toluene phase, an aqueous phase and an oil phase insoluble in toluene and alkali solution in that order downwardly in about 5 minutes. The toluene phase was separated and analyzed by gas chromatography under the following conditions, finding that the amount of trioctylphosphine contained therein was 80 ppm.

Gas chromatography analysis reactions

Tower: UA-1HT 0.53 mm×15 m, 0.15 μm

Carrier gas: He, 15 ml/min

Split ratio: 1/2

Purge gas: 15 ml/min

Detector: Flame photometer (provided with a filter for phosphorus (526 nm))

Detection temperature: 320° C.

Column temperature program: 50° C.→300° C. (20 min) 300° C. (20 min)

Injector temperature program: 180° C. (30 min) 180° C.→350° C. (about 2 min) 350° C. (18 min)

Example 8

108.39 g of concentrated catalyst solution obtained in Reference Example 2, 315.32 g of 0.5N-NaOH solution and 126.1 g of toluene were supplied into an extractor having a stirrer and stirred at an internal temperature of 40° C. for one hour. When left stationary, the solution separated into a toluene phase, an aqueous phase and an oil phase insoluble in toluene and alkali solution in that order downwardly in about 5 minutes. The toluene phase was separated and analyzed by gas chromatography under the conditions described above, finding that the trioctylphosphine content in this phase was 63 ppm.

Example 9

122.43 g of concentrated catalyst solution obtained in Reference Example 2, 356.19 g of 3.0N-NaOH solution and 122.43 g of toluene were supplied into an extractor with a stirrer and stirred at an internal temperature of 40° C. for one hour. When left stationary, the solution separated into a toluene phase, an aqueous phase and an oil phase insoluble in toluene and alkali solution. The toluene phase was separated and analyzed by gas chromatography under the conditions described above, finding that the trioctylphosphine content in this phase was 198 ppm.

Example 10

501.51 g of hydrogenation reaction solution of succinic anhydride obtained in Reference Example 1 and 506.04 g of 0.1N-NaOH solution were put into a sealable container and mixed by shaking for about 5 minutes. When the solution was left stationary for about 5 hours, brown oil was seen settling at the bottom of the aqueous phase. The aqueous phase was removed by decantation to obtain 29.6 g of oil phase. This oil phase was extracted with toluene (once with 100 ml of toluene and twice with 50 ml of toluene) and the obtained toluene phase was washed with water (5 times with 100 ml of water). Then the toluene phase was concentrated by evaporation to give 8.28 g of brown oil.

To this brown oil was added a hydrogenation reaction solvent triglyme to make the overall amount 200 g. Then 825 mg of paratoluenesulfonic acid was added and the resultant mixture was treated at 200° C. for 10 minutes by bubbling nitrogen through the solution. The above operations were all conducted in a nitrogen atmosphere.

In 175 g of this catalyst solution were mixed 20 g of succinic anhydride and 5 g of γ-butyrolactone in a nitrogen atmosphere. The ruthenium concentration of this mixed solution was 123 ppm. This mixed solution was supplied into a 500 ml autoclave provided with an induction stirrer and having its internal atmosphere replaced with nitrogen. 5 KG nitrogen gas was introduced under pressure into said autoclave. Then the autoclave was heated to elevate the internal temperature to 200° C. Stirring was started when the temperature reached 120° C. in the course of heating. When the internal temperature became 200° C., 0-minute sample was collected, the internal pressure was purged out, hydrogen was introduced to make the internal pressure 40 KG, and hydrogenation reaction was instituted. During the reaction, hydrogen was supplied appropriately to keep the internal pressure at 40 KG. The reaction was continued for one hour, and sample was collected at the time points of 3 minutes and 60 minutes during the reaction. The total amount of succinic anhydride and succinic acid remaining in the samples collected at the time points of 0 minute and 3 minutes were determined by liquid chromatography, and the initial-phase primary rate constant of the reaction was calculated therefrom. It was 21.9 h.$^{-1}$.

The extracted and recovered ruthenium-containing oil was treated in the same manner as described in the above procedure except that the operations till dilution of said oil with triglyme were conducted in an air atmosphere. The primary rate constant of hydrogenation reaction was 20.3 h.$^{-1}$.

By the way, 0.222 g of tris (acetylacetone)ruthenium, 2.068 g of trioctylphosphine, 0.902 g of paratoluenelsulfonic acid and 346.82 g of triglyme were supplied into a jacket type reactor and heated at 200° C. for 2 hours in a nitrogen atmosphere to prepare a fresh catalyst. Hydrogenation reaction of succinic anhydride was carried out using the obtained fresh catalyst according to the procedure described above. Ruthenium concentration of the reaction solution after addition of the substrate was 141 ppm (calculated) and the primary rate constant of the hydrogenation reaction was 21.4 h.$^{-1}$.

Accordingly, no reduction of hydrogenation reaction catalytic activity of the recovered ruthenium complex was caused by the recovering operations.

Example 11

172.23 g of concentrated version of hydrogenation reaction solution of succinic anhydride obtained in Reference Example 2 was supplied into a sealable container and heated in a 150° C. oil bath. To this solution were added 501.35 g of 0.1N-NaOH solution and 189.63 g of toluene and mixed by shaking for about 5 minutes. The above operations were conducted in a nitrogen atmosphere, but the following operations were carried out in an air atmosphere. When left stationary, the solution separated into a toluene phase, an aqueous phase and an oil phase insoluble in both of said phases. The toluene phase was separated out and concentrated by evaporation to give 9.45 g of brown oil. A hydrogenation reaction solvent triglyme was added to this brown oil to make the overall amount 200 g. 737 mg of paratoluenesulfonic acid was further added and the mixed solution was treated at 200° C. for 10 minutes by bubbling nitrogen through the solution. Then succinic anhydride and γ-butyrolactone were added in the same way as Example 10. The ruthenium concentration of the mixed solution was 136 ppm. Thereafter, hydrogenation reaction of succinic anhydride was carried out in accordance with Example 10. The primary rate constant of the hydrogenation reaction was 25.3 h.$^{-1}$.

Example 12

5 g of concentrated reaction solution obtained in Reference Example 2, 14 g of desalted water and 6 g of toluene were supplied into a sealable sample flagon and mixed at room temperature for 5 minutes. The number of days required for separating three phases, biz. toluene phase, aqueous phase and oil phase insoluble in both of said phases was about 7 days. ICP determination of ruthenium content of the toluene phase showed that not less than 80% of ruthenium has been distributed in the toluene phase.

Example 13

123.7 g of concentrated catalyst solution obtained in Reference Example 2, 359.6 g of 0.1N-NaOH solution and 144 g of xylene were supplied into an extractor provided with a stirrer and stirred at an internal temperature of 40° C. for one hour. When left stationary, the solution separated into a xylene phase, an aqueous phase and an oil phase insoluble in both xylene and alkali solution in that order downwardly in about 15 minutes. These three phases were separated and their mass and ruthenium concentration were determined by ICP analysis to obtain the following results:

|  | Mass | Ru concentration |
|---|---|---|
| Xylene phase | 143.2 g | 285 ppm |
| Aqueous phase | 422.9 g | 0 ppm |
| Oil phase | 57.9 g | 4 ppm |

The xylene phase/aqueous phase/oil phase ruthenium distribution ratio was 99.4/0/0.6.

Xylene in the xylene phase was evaporated away to give 19.5 g of residue. This means that this toluene phase was concentrated to 15.76% based on the charged concentrated catalyst solution.

Example 14

124.6 g of concentrated catalyst solution obtained in Reference Example 2, 364.2 g of 0.1N-NaOH solution and 145.1 g of benzene were supplied into an extractor provided with a stirrer and stirred at an internal temperature of 40° C. for one hour. When left stationary, the solution separated into a benzene phase, an aqueous phase and an oil phase insoluble in both benzene and alkali solution in that order downwardly in about 15 minutes. These three phases were separated and their mass and ruthenium concentration were determined by ICP analysis to obtain the following results:

|  | Mass | Ru concentration |
|---|---|---|
| Benzene phase | 134.02 g | 315 ppm |
| Aqueous phase | 410.6 g | 0 ppm |
| Oil phase | 81.9 g | 22 ppm |

The benzene phase/aqueous phase/oil phase ruthenium distribution ratio was 95.6/0/4.4.

Benzene in the benzene phase was evaporated away to give 9.4 g of residue. This means that this toluene phase was concentrated to 7.5% based on the charged concentrated catalyst solution.

Example 15

115 g of concentrated catalyst solution obtained in Reference Example 2, 334.56 g of 0.1N-NaOH solution and 133.82 g of decane were supplied into an extractor provided with a stirrer and stirred at an internal temperature of 40° C. for one hour. When left stationary, the solution separated into a decane phase, an aqueous phase and an oil phase insoluble in both decane and alkali solution in that order downwardly in about 15 minutes. These three phases were separated and their mass and ruthenium concentration were determined by ICP analysis to obtain the following results:

|  | Mass | Ru concentration |
|---|---|---|
| Decane phase | 134.24 g | 219 ppm |
| Aqueous phase | 394.76 g | 0 ppm |
| Oil phase | 49.24 g | 68.1 ppm |

The decane phase/aqueous phase/oil phase ruthenium distribution ratio was 89.77/0/10.23.

Decane in the decane phase was evaporated away to give 0.42 g of residue. This means that this toluene phase was concentrated to 0.3% based on the charged concentrated catalyst solution.

Example 16

106.48 g of concentrated catalyst solution obtained in Reference Example 2, 309.75 g of 0.1N-NaOH solution and 123.90 g of heptane were supplied into an extractor provided with a stirrer and stirred at an internal temperature of 40° C. for one hour. When left stationary, the solution separated into a heptane phase, an aqueous phase and an oil phase insoluble in both heptane and alkali solution in that order downwardly in about 15 minutes. These three phases were separated and their mass and ruthenium concentration were determined by ICP analysis to obtain the following results:

|  | Mass | Ru concentration |
|---|---|---|
| Heptane phase | 115.49 g | 274 ppm |
| Aqueous phase | 377.57 g | 0 ppm |
| Oil phase | 36.99 g | 67.5 ppm |

The heptane phase/aqueous phase/oil phase ruthenium distribution ratio was 92.0/0/8.0.

Heptane in the heptane phase was evaporated away to give 0.52 g of residue. This means that this heptane phase was concentrated to 0.48% based on the charged concentrated catalyst solution.

What is claimed is:

1. A method for separating a ruthenium complex, which comprises removing an objective hydrogenation reaction product from a hydrogenation reaction solution of an organic carbonyl compound in the presence of a ruthenium complex having a tertiary organic phosphorus compound as ligand to obtain a catalyst solution, contacting said catalyst solution with a polar solvent, and carrying out a phase-separation into a liquid phase substantially composed of the polar solvent and an another liquid phase substantially containing the ruthenium complex.

2. A method for separating ruthenium complex according to claim 1, wherein the polar solvent is a solvent whose dielectric constant ($\epsilon$) at 20° C. is not less than 15.

3. A method for separating ruthenium complex according to claim 1, wherein the polar solvent is selected from water and lower alcohols having 1 to 8 carbon atoms.

4. A method for separating ruthenium complex according to claim 1, wherein the organic carbonyl compound is aliphatic dicarboxylic acids, aliphatic dicarboxylic acid anhydrides or aliphatic dicarboxylic acid diesters.

5. A method for separating ruthenium complex according to claim 1, wherein the organic carbonyl compound is succinic anhydride.

6. A method for separating ruthenium complex according to claim 1, wherein the tertiary organic phosphorus compound is trialkylphosphine.

7. A method for separating ruthenium complex according to claim 1, wherein the tertiary organic phosphorus compound is trioctylphosphine.

8. A method for separating ruthenium complex according to claim 1, wherein the catalyst solution is a solution obtained by removing the objective reaction product and the reaction solvent from the hydrogenation reaction solution by distillation.

9. A method for separating ruthenium complex according to claim 8, wherein the reaction solvent is distilled away from the hydrogenation reaction solution at a temperature of not more than 220° C.

10. A method for separating ruthenium complex according to claim 1, wherein the catalyst solution is contacted with a polar solvent containing a basic substance.

11. A method for separating ruthenium complex according to claim 10, wherein the basic substance is hydroxides of alkali metals, hydroxides of alkaline earth metals, organic amines or ammonia.

12. A method for separating ruthenium complex according to claim 11, wherein the basic substance is sodium hydroxide or potassium hydroxide.

13. A method for separating a ruthenium complex, which comprises removing an objective hydrogenation reaction product from a hydrogenation reaction solution of an organic carbonyl compound in the presence of a ruthenium complex having a tertiary organic phosphorus compound as ligand to obtain a catalyst solution, contacting said catalyst solution with water and nonpolar organic solvent, separating a nonpolar organic solvent phase containing the ruthenium complex, and removing the nonpolar organic solvent from said nonpolar organic solvent phase by distillation.

14. A method for separating ruthenium complex according to claim 13, wherein the nonpolar organic solvent is a solvent whose dielectric constant ($\epsilon$) at 20° C. is not more than 6.

15. A method for separating ruthenium complex according to claim 13, wherein the nonpolar organic solvent is aliphatic hydrocarbons, aromatic hydrocarbons, ethers, ketones, halogenated hydrocarbons or mixtures thereof.

16. A method for separating ruthenium complex according to claim 15, wherein the nonpolar organic solvent is toluene, xylene, heptane, decane or a mixture thereof.

17. A method for separating ruthenium complex according to claim 10, which comprises hydrogenating succinic anhydride in a triglyme solvent in the presence of a ruthenium complex having trialkyl phosphine as ligand, removing γ-butyrolactone and water from the hydrogenation reaction solution by distillation to obtain a catalyst solution, contacting at least a part of the catalyst solution with an aqueous solution of a sodium hydroxide or potassium hydroxide, and separating the liquid phase rich with ruthenium complex.

18. A method for separating ruthenium complex according to claim 13, which comprises removing γ-butyrolactone and water from the reaction solution obtained by hydrogenating succinic anhydride in a triglyme solvent in the presence of a ruthenium complex having trialkyl phosphine as ligand, distilling away triglyme in a distillation tower while maintaining the bottom temperature at not more than 220° C. to obtain a catalyst solution, contacting at least a part of the catalyst solution with water and an aliphatic or aromatic hydrocarbon, and separating the aliphatic or aromatic hydrocarbon phase rich with ruthenium complex.

19. A method for separating ruthenium complex, which comprises removing an objective hydrogenation reaction product from a hydrogenation reaction solution of an organic carbonyl compound in the presence of a ruthenium complex having a tertiary organic phosphorus compound as ligand to obtain a catalyst solution, contacting said catalyst solution with a polar solvent and a nonpolar organic solvent successively or simultaneously, carrying out a phase-separation into a phase substantially composed of the polar solvent and an organic solvent phase substantially containing the ruthenium complex, and removing the organic solvent from said organic solvent phase by distillation.

20. A method for separating ruthenium complex according to claim 19, wherein the nonpolar organic solvent is a solvent whose dielectric constant ($\epsilon$) at 20° C. is not more than 6.

21. A ruthenium complex separating process according to claim 19, wherein the polar solvent is a polar solvent containing a basic substance.

22. A method for reusing a ruthenium complex, which comprises removing an objective hydrogenation product from a hydrogenation reaction solution of an organic carbonyl compound in the presence of a ruthenium complex having a tertiary organic phosphorus compound as ligand to obtain a catalyst solution, contacting said catalyst solution with a polar solvent, carrying out a phase-separation into a liquid phase substantially containing the polar solvent and an another liquid phase substantially containing the ruthenium complex, and supplying the separated liquid phase substantially containing the ruthenium complex to the hydrogenation reaction system.

23. A method for reusing a ruthenium complex according to claim 22, wherein the separated liquid phase substantially containing the ruthenium complex is further treated with an acid.

24. A method for reusing a ruthenium complex according to claim 22, wherein the polar solvent is a solvent whose dielectric constant ($\epsilon$) at 20° C. is not less than 15.

25. A method for reusing a ruthenium complex according to claim 23, wherein the acid used for treating the liquid phase substantially containing the ruthenium complex is alkylsulfonic acid or arylsulfonic acid.

26. A method for reusing a ruthenium complex according to claim 25, wherein the acid is p-toluenesulfonic acid.

27. A method for reusing a ruthenium complex according to claim 22, wherein the catalyst solution is contacted with a polar solvent containing a basic substance.

28. A method for reusing a ruthenium complex according to claim 22, wherein the catalyst solution is contacted with water and a nonpolar organic solvent.

29. A method for reusing a ruthenium complex, which comprises removing an objective hydrogenation reaction product from a hydrogenation reaction solution of an organic carbonyl compound in the presence of a ruthenium complex having a tertiary organic phosphorus compound as ligand to obtain a catalyst solution, contacting said catalyst solution with a polar solvent and a nonpolar organic solvent successively or simultaneously, carrying out a phase-separation into a phase substantially composed of the polar solvent and an organic solvent phase substantially containing the ruthenium complex, removing the organic solvent from said organic solvent phase by distillation, and supplying the obtained ruthenium complex-containing residue to the hydrogenation reaction system.

30. A method for reusing a ruthenium complex according to claim 29, wherein the obtained residue is further treated with an acid.

31. A method for reusing a ruthenium complex according to claim 29, wherein the nonpolar organic solvent is a solvent whose dielectric constant ($\epsilon$) at 20° C. is not more than 6.

32. A method for reusing a ruthenium complex according to claim 29, wherein the catalyst solution is contacted with a polar solvent containing a basic substance.

33. A method for reusing a ruthenium complex according to claim 30, wherein the amount of a free acid in the acid used for the acid-treatment is at least equivalent to the tertiary organic phosphine contained in the residue.

34. A method for reusing a ruthenium complex according to claim 29, wherein the catalyst solution is contacted with water and a nonpolar organic solvent.

35. A method for reusing a ruthenium complex according to claim 34, wherein the dielectric constant ($\epsilon$) at 20° C. of the nonpolar organic solvent is not more than 6.

36. A method for reusing a ruthenium complex, which comprises hydrogenating succinic anhydride in a reaction solution in the presence of a ruthenium complex having trialkylphosphine as ligand, removing $\gamma$-butyrolactone and water from the reaction product, distilling away the reaction solvent in a distillation tower while maintaining the bottom temperature at not more than 220° C. to obtain a catalyst solution, contacting at least a part of said catalyst solution with an aqueous solution of sodium hydroxide or potassium hydroxide and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing solution, treating the obtained solution with an acid, and supplying the thus treated solution to the hydrogenation reaction system.

37. A method for reusing a ruthenium complex according to claim 36, wherein the hydrogenation reaction is carried out at a ruthenium complex concentration of 100 to 500 ppm (calculated as metallic ruthenium), under a partial pressure of hydrogen of 1 to 50 kg/cm$^2$ and at a temperature of 150° to 220° C.

38. A method for reusing a ruthenium complex, which comprises hydrogenating succinic anhydride in a reaction solvent in the presence of a ruthenium complex having trialkylphosphine as ligand, removing $\gamma$-butyrolactone and water from the reaction product, distilling away the reaction solvent in a distillation tower while maintaining the bottom temperature at not more than 220° C. to obtain a catalyst solution, contacting at least a part of said catalyst solution with water and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing solution, treating the obtained solution with an acid, and supplying the thus treated solution to the hydrogenation reaction system.

39. A method for reusing a ruthenium complex according to claim 38, wherein the hydrogenation reaction is carried out at a ruthenium complex concentration of 100 to 500 ppm (calculated as metallic ruthenium), under a partial pressure of hydrogen of 1 to 50 kg/cm$^2$ and at a temperature of 150° to 220° C.

40. A process for preparing $\gamma$-butyrolactone, which comprises hydrogenating succinic anhydride in a reaction solvent in the presence of a ruthenium complex having trialkylphosphine as ligand, removing $\gamma$-butyrolactone and water from the reaction solution, distilling away the reaction solvent in a distillation tower while maintaining the bottom temperature at not more than 220° C. to obtain a catalyst solution, contacting at least a part of said catalyst solution with an aqueous solution of sodium hydroxide or potassium hydroxide and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing solution, treating the obtained solution with an acid, and supplying the thus treated solution to the hydrogenation reaction system.

41. A process for preparing γ-butyrolactone according to claim 40, wherein the hydrogenation reaction is carried out at a ruthenium complex concentration of 100 to 500 ppm (calculated as metallic ruthenium), under a partial pressure of hydrogen of 1 to 50 kg/cm$^2$ and at a temperature of 150° to 220° C.

42. A process for preparing γ-butyrolactone, which comprises hydrogenating succinic anhydride in a reaction solution in the presence of a ruthenium complex having trialkylphosphine as ligand, removing γ-butyrolactone and water from the reaction product, distilling away the reaction solvent in a distillation tower while maintaining the bottom temperature at not more than 220° C. to obtain a catalyst solution, contacting at least a part of said catalyst solution with water and an aliphatic or aromatic hydrocarbon, separating the formed aliphatic or aromatic hydrocarbon phase rich with ruthenium complex, removing the aliphatic or aromatic hydrocarbon from the separated aliphatic or aromatic hydrocarbon phase by distillation, adding a reaction solvent to the obtained ruthenium complex-containing residue to form a ruthenium complex-containing solution, treating the obtained solution with an acid, and supplying the thus treated solution to the hydrogenation reaction system.

43. A process for preparing γ-butyrolactone according to claim 42, wherein the hydrogenation reaction is carried out at a ruthenium complex concentration of 100 to 500 ppm (calculated as metallic ruthenium), under a partial pressure of hydrogen of 1 to 50 kg/cm$^2$ and at a temperature of 150° to 220° C.

44. A process for recovering a tertiary organic phosphorus compound, which comprises hydrogenating an organic carbonyl compound in the presence of a ruthenium complex having a tertiary organic phosphorus compound as ligand and an excess amount of a tertiary organic phosphorus compound, removing an objective hydrogenation reaction product of organic carbonyl compound from the hydrogenation reaction solution to obtain a catalyst solution, contacting the obtained catalyst solution with a polar solvent, and separating the resultant solution into a liquid phase substantially containing the polar solvent and an another liquid phase containing a tertiary organic phosphorus compound.

45. A process for recovering a tertiary organic phosphorus compound, which comprises hydrogenating an organic carbonyl compound in the presence of a ruthenium complex having a tertiary organic phosphorus compound as ligand and an excess amount of a tertiary organic phosphorus compound, removing an objective hydrogenation reaction product of organic carbonyl compound from the hydrogenation reaction solution to obtain a catalyst solution, contacting the catalyst solution with a polar solvent and a nonpolar organic solvent successively or simultaneously, carrying out a phase-separation into a phase substantially composed of the polar solvent and an organic solvent phase substantially containing a tertiary organic phosphorus compound, removing the organic solvent from said organic solvent phase by distillation.

* * * * *